Figure 1:
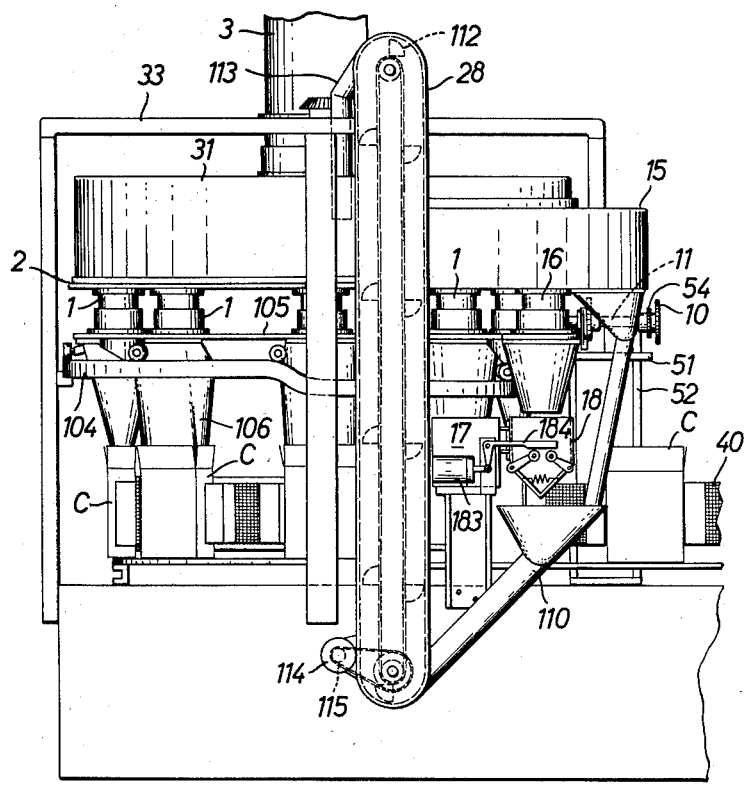

Aug. 13, 1963  U. BAUDER  3,100,584
DISPENSING MACHINE OPERATING ON VOLUMETRIC PRINCIPLE
Filed Oct. 7, 1960  3 Sheets-Sheet 1

United States Patent Office 3,100,584
Patented Aug. 13, 1963

3,100,584
DISPENSING MACHINE OPERATING ON
VOLUMETRIC PRINCIPLE
Ulrich Bauder, Stuttgart-West, Germany, assignor to
Firma Fr. Hesser Maschinenfabrik-Aktiengesellschaft,
Stuttgart-Bad Cannstatt, Germany, a corporation of
Germany
Filed Oct. 7, 1960, Ser. No. 61,131
Claims priority, application Germany Oct. 7, 1959
13 Claims. (Cl. 222—55)

My invention is concerned with a dispensing machine operating on volumetric principle and having measuring chambers being adapted to be adjusted automatically by a control measuring device in accordance with the varying poured weight of filling material passing into said machine; one object of my invention is to give weights of charge which remain as constant as possible.

For this purpose, it is known to insert one or even a plurality of weighers between the circulating measuring chambers and the packages which are to be filled, the weighers then regulating the measuring chambers through corresponding control members in dependence upon the particular pre-set weight. This arrangement has the disadvantage that comparatively large filling heights are involved, with the reduced output and the dust production which results therefrom, and that the regulation of the measuring chambers is defective because the measuring and evaluation in accordance with the weight does not take place until a specific time after dispensation.

It has been further more known to arrange the control measuring device in advance of the measuring out chambers, in such a way that test samples of charged material can be taken, at regular intervals of time, from the feed channel leading to the measuring chambers by means of a further volumetric measuring out device, and can be weighed by means of a weigher, the latter then controlling in turn the regulation of the measuring out chambers.

Even in this case completely satisfactory results cannot be obtained since the charged weight, which, as is known, is very much dependent on the pressure on and the air contained in the charged material, generally has, at the place where the control measuring device is located, other values than later in the distributor plate which supplies the actual measuring out chambers with the charged material. Moreover tests have shown that with many charged materials areas where the material segregates as regards grain size occur in the feed channel so that when the test sample is taken the danger arises of the measured values not corresponding to the actual values, that is the values which the charged material has when it is properly mixed up in the distributor plate.

The first object of my invention is therefore to remove the previous defects and to so construct and arrange the device which is used to correct the weight, that the charged material measured and weighed out by it corresponds exactly each time to the charged material which reaches the measuring out container immediately following these controlling measurements.

For this purpose my invention resides in the fact that the control measuring device comprising an adjustable control measuring chamber and an associated control-signal-emitting weigher, and being arranged directly at the periphery of and in parallel with the distributor plate means supplying measuring chambers of said dispensing machine, and being provided with a conveyor device taking filling material from said distributor plate and filling it into said control measuring chamber.

Still another object of my invention is to obtain uniformity in the conditions of charging of the control measuring chamber; to this aim said conveyor device of said control measuring device can comprise at least one radially arranged wiper plate means being rotatable in a housing in a horizontal plane so that the path of travel thereof overlaps said distributor plate and covers an upper opening of said control measuring chamber.

Furthermore, my invention resides in the features of combination, construction and arrangement hereinafter described and claimed.

Figure 4:
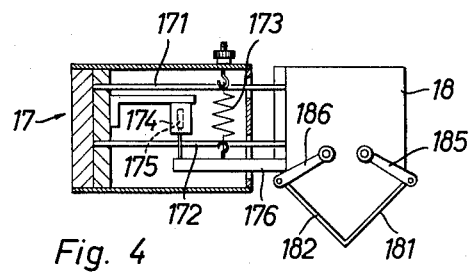
Figures 2, 3:
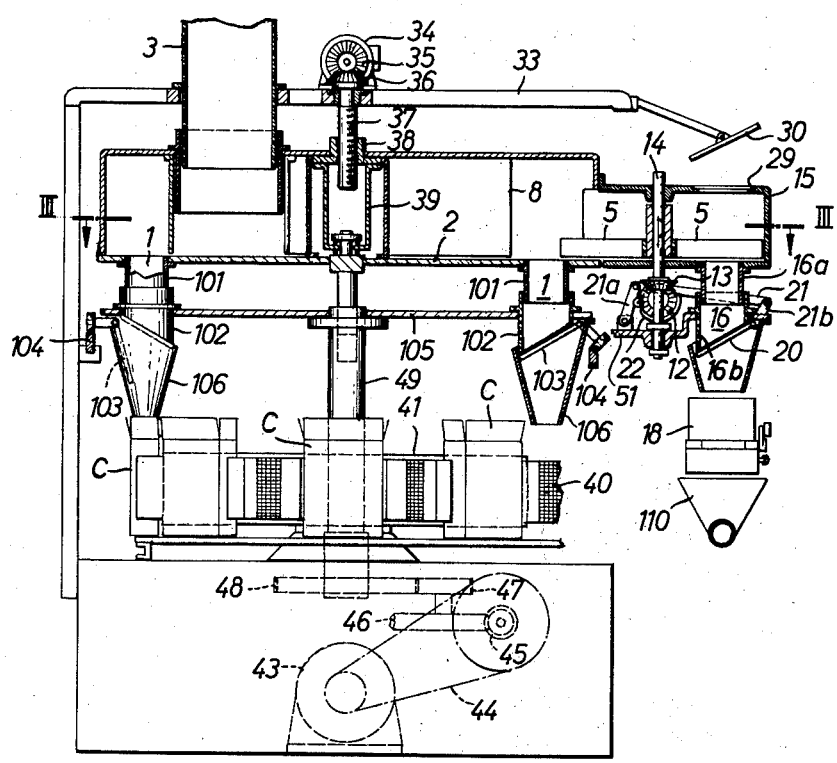
Figure 5:
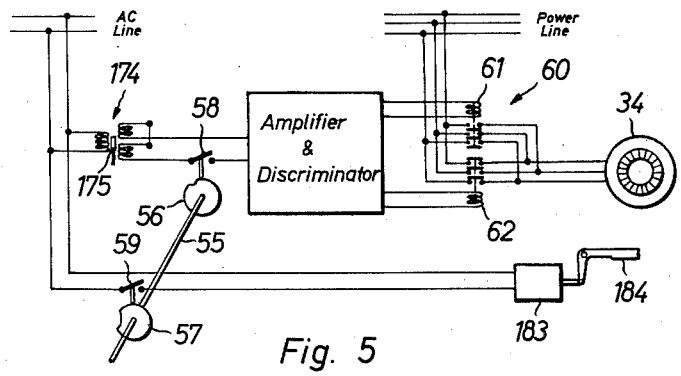
Figure 6:
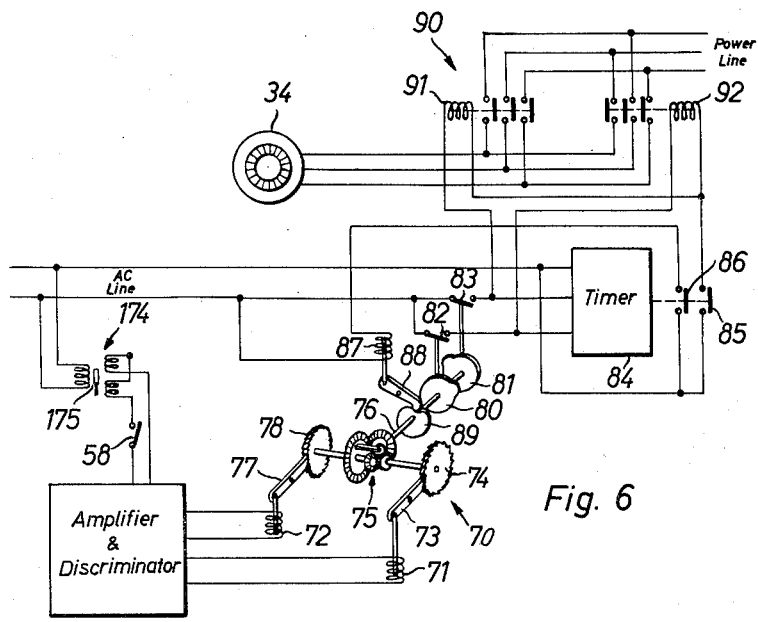

For understanding of my invention and for illustration of a preferred form thereof, reference is to be had to the accompanying drawings in which:

FIGURE 1 is a side view of a dispensing machine operating on the volumetric principle and having an attached control measuring device, FIGURE 2 is a cross section of the machine according to the lines II—II of FIGURE 3, FIGURE 3 is a cross section of the machine according to the lines III—III of FIGURE 2, FIGURE 4 is a cross section of a check weighing device, FIGURE 5 is a switching diagram of an adjusting device, and FIGURE 6 is a further switching diagram of an adjusting device.

Referring now to the drawings, there is shown a volumetric dispensing machine of known type as disclosed for example in U.S. Patent 2,320,581 of George B. First and Hans Grotewold, provided with a plurality of rotating measuring chambers 1. The measuring volume of the measuring chambers 1 consisting of telescoping cups 101, 102 is centrally adjustable and is changed by raising or lowering the distributor plate 2 to which the upper cups 101 are secured. The lower cups 102 are arranged on a plate 105 and are provided with bottom flaps 103, which, at predetermined time intervals, open the measuring chambers 1 for discharging.

Bulk material is supplied to the machine through a supply tube 3 opening to the distributor plate 2. During rotation of the plate 2, the material is passed into the measuring chambers 1 by means of guide blades 7, 8 secured to the nonrotating cover 31 of the distributor plate 2. After having been filled, the measuring chambers 1 come in alignment with containers C which are fed to the machine by means of a continuously running conveyor belt 40, guided upon a rotating drum 41, the said bottom flaps 103 being controlled by a fixed cam rail 104 in such a way that the measured quantities of material are discharged through discharge snouts 106 into the containers C. Drum 41 for conveyor belt 40 and distributor plate 2 including measuring chambers 1 are rotated by an electric motor 43, which by means of a belt drive 44, worm gearing 45, 46 and gears 47, 48 drives a vertical shaft 49 to which the drum 41 and the plate 105 are attached. Distributor plate 2 and its cover 31 are suspended in frame 33 by a spindle 37 carrying a thread 38, to which is secured the cover 31 and a supporting member 39, to which the distributor plate 2 is rotatably attached.

A control measuring device is installed at the periphery of and parallel with the distributor plate 2 and comprises a control measuring chamber 16 and a weigher 17 associated therewith. The control measuring chamber 16 receives the fluent material, which is to be measured, directly from the distributor plate 2. For this purpose a plurality of horizontally rotating, wing-like, radially arranged wiper plates 5 are provided, the path of circulatory travel thereof overlapping the distributor plate 2 and covering the opening of the control measuring chamber 16.

The wiper plates 5, which rotate in a housing 15, are driven by a controllable electromotor 50 through a chain drive 10, a horizontal shaft 11, a bevel gear 12, 13 and a vertical shaft 14, on which the wiper plates 5 are mounted for axial adjustment. During their rotation the wiper plates 5 convey bulk material from the distributor plate 2 to the control measuring chamber 16, which is mounted on the bottom of the circular housing 15 being fixedly secured with a cover part 31.

After each revolution of the wiper plates 5 the control measuring chamber 16 is discharged into the weighing holder 18 of a weigher 17 to allow the actual weight of the measured quantity to be determined. So that no further filling material shall be conveyed into the control measuring chamber 16 during this time, an arcuate cover plate 19 is fastened to the peripheral part of two more widely-spaced wiper plates 5 and this prevents filling material being taken from the distributor plate 2 in this region.

The control measuring chamber 16 is discharged by rocking a bottom flap 20, which is controlled through a linkage 21, 21a, 21b from a cam plate 22 fastened on the horizontal shaft 11. If the measured out quantity of filling material has an overweight or an underweight, a corresponding adjustment of said measure chamber 1 is executed through an adjusting motor 34. This adjusting motor 34 is located on the frame 33 of the machine and drives the spindle 37 through bevel gears 35, 36.

For each right hand or left hand rotation of the adjusting motor 34, the distributor plate 2 and cover 31 are respectively raised or lowered, the dispensing space in the telescopic measuring chambers 1 being increased or decreased.

Along with this adjustment of the dispensing volume of the measuring chambers 1, the volume of the control measuring chamber 16, which is likewise telescopic, is correspondingly regulated. The control measuring chamber 16 is of the same size as a measuring chamber 1. The upper part 16a of the control measuring chamber 16 is fastened to the housing 15, which is in its turn firmly connected to the cover 31. The lower part 16b is arranged on a stationary plate 51, in which is also mounted the drive shaft 14 of the wiper plates 5.

On the plate 51 being mounted on a support 52 there are also disposed the adjusting motor 50, the horizontal shaft 11 and the control casing 53; the latter is connected with the shaft 11 by means of a chain drive 54. In this control casing there are mounted cam discs 56, 57 on a shaft 55 rotating with the same number of turns as the shaft 14; these cam discs control through contact switches 58, 59 the measuring moment and the emptying of the weighing pan 18.

The weighing device 17 provided for a check weighing is a common electro-mechanical scale. As shown in FIG. 4 the weighing pan is suspended on leaf springs 171, 172 and on a tension spring 173. The adjusting path cause by the material quantity filled into the weighing pan 18 is measured by means of a stationary located differential transformer 174, the movable core 175 thereof is connected fixedly by means of an arm 176 with the weighing pan 18.

A displacement of the core caused by weighing effects within the secondary winding of said differential transformer 174 a zero voltage when the weight of the volumetrically weighed quantity is exact and in case of underweight or overweight a voltage impulse corresponding to the latter and having a corresponding intensity and phase. These impulses are amplified within an amplifier classified according to the phase within a distributor in order to decrease or increase the capacity of the measuring chambers 2.

The evaluation of the weighing results can be executed by different ways: on the one hand in using each control weighing for correcting the dispensing volume and on the other hand only in an adjustment after determining a tendency of overweight and underweight.

For the first way of evaluation according to FIG. 5 the amplifier and the discriminator are directly switched behind a turn over relay 60. In accordance to the underweight or overweight the relay 61 or the relay 62 are excited so that the adjusting motor 34 is switched on in one or the other rotary direction during a specific time period.

For the second way of evaluation there is provided between the amplifier and the turn over relay according to FIG. 6 an adding mechanism of common type, e.g. a stopping switch 70 which can be switched in two directions. This mechanism is adding the negative or positive impulses corresponding to an underweight or overweight and separated from the discriminator, after having reached a certain summation of positive or negative impulses this stopping switch is initiating a correcting adjustment of the dispensing volume of the measuring chambers 1.

When the weighing device is indicating an underweight the discriminator is exciting a solenoid 71 of the stopping switch 70 and correspondingly a solenoid 72 in the case of an overweight. The solenoid 71 effects on each excitation through a ratchet 73, a ratchet wheel 74 and a differential gear 75 a left-hand rotation of the control shaft 76 for a specific angle. In the same way the other solenoid 72 effects through a ratchet 77, a ratchet wheel 78 and the differential gear 75 a right-hand rotation of the control shaft 76 for the same angle. On the control shaft 76 two cam discs 80, 81 are secured, the cams thereof deviate in the normal or zero position from the vertical for a specific angle so that after reaching of a specific summation the left-hand or right-hand negative or positive impulses or steps one cam of one of these cam discs 80 or 81 is rotated in the vertical. By means of this a contact 82 or 83 is closed which are contained in the circuits of a turn over relay 90 for the adjusting motor 34 and in the circuit of a time relay or timer 84. The timer 84 closes then for a specific time period a contact 85 which is also contained within the circuit of the turn over relay 90; by this means one of the relays 91 or 92 are excited according to the closed contact 82 or 83. This results in a left-hand or righthand rotation of the adjusting motor.

On each volumetric dispensing adjustment the stopping switch 70 is replaced to the zero position. For this reason the time relay 84 is switching also a contact 86 disposed within the circuit of the solenoid 87.

After excitation this solenoid 87 is urged by means of a lever 88 on a heart-shaped cam disc 89 secured on the control shaft 76 so that the latter is returned to the zero position.

Having the result of one measurement the weighed quantity is poured out by opening the bottom traps 181, 182 of the weighing pan 18 into a hopper 110. The pouring out is caused by an electro-magnet 183 which is urging both the levers 185, 186 downwardly through an angle lever 184, which are connected with the bottom traps 181, 182. The electro-magnet is controlled through the cam disc 57 and the contact switch 59.

The material poured out from the weighing pan 18 into the hopper 110 is coming within a vertical conveyor, e.g. a bucket conveying device 28 which transports the material by means of the buckets 112 upwardly and pours it back through a tube 113 into the distributing plate 2 for filling the container C. The bucket conveying device or bucket chain 28 is driven continuously by an electromotor 114 through a chain drive 115.

An opening 27 is provided in the bottom of the housing 15 behind the control measuring chamber 16 in the direction of movement of the wiper plate, so that the filling material taken from the distributor plate 2 by the wiper plates 5 should not be carried around further by the wiper plates 5 should the control measuring container be full. The excess filling material drops through this opening 27 and is also fed back by the conveyor device 28 to the distributor plate 2. An opening 29 having an obliquely positioned mirror 30 above it is provided in the upper side of the housing 15 to enable the conveyance of the filling material by the wiper plates 5 to be observed from the attendant's position.

Regulation of the quantity conveyed to the control measuring device can be carried out by rocking a guide plate 32.

What I claim is:

1. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device being separate from but arranged in the plane of said distributor plate means beyond the periphery thereof and comprising an adjustable control measuring chamber, an associated signal-emitting weigher, and a conveyor device taking said filling material from said distributor plate and filling it into said control measuring chamber.

2. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said conveyor device of said control measuring device comprising at least one radially arranged wiper plate means being rotatable in a housing in a horizontal plane so that the path of travel thereof overlaps said distributor plate and covers an upper opening of said control measuring chamber.

3. A dispensing machine operating on volumetric principle and having measuring chambers being adapted to be adjusted automatically by a control measuring device in accordance wtih the varying poured weight of filling material passing into said machine, and distributor plate means supplying said measuring chambers with said filling material, said control measuring device comprising an adjustable control measuring chamber and an associated signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said control measuring chamber being of the same size as said measuring chambers of said dispensing machine and having means to be adjustable simultaneously with said measuring chambers.

4. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said conveyor device of said control measuring device comprising at least one radially arranged wiper plate means being rotatable in a housing in a horizontal plane so that the path of travel thereof overlaps said distributor plate and covers an upper opening of said control measuring chamber, said control measuring chamber being of the same size as the said measuring chambers of said dispensing machine and having means to be adjustable simultaneously with said measuring chambers.

5. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said conveyor device of said control measuring device comprising at least one radially arranged wiper plate means being rotatable in a housing in a horizontal plane so that the path of travel thereof overlaps said distributor plate and covers an upper opening of said control measuring chamber, two of said wiper plate means being connected together at the periphery by a further plate, for shutting off the control measuring chamber from the supply during the discharge.

6. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said control measuring chamber being of the same size as said measuring chambers of said dispensing machine and having means to be adjustable simultaneously with said measuring chambers, two of said wiper plate means being connected together at the periphery by a further plate, for shutting off the control measuring chamber from the supply during the discharge.

7. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said conveyor device of said control measuring device comprising at least one radially arranged wiper plate means being rotatable in a housing in a horizontal plane so that the path of travel thereof overlaps said distributor plate and covers an upper opening of said control measuring chamber, said control measuring chamber being of the same size as the said measuring chambers of said dispensing machine and having means to be adjustable simultaneously with said measuring chambers, two of the said wiper plate means being connected together at the periphery by a further plate, for shutting off the control measuring chamber from the supply during the discharge.

8. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated control-signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, and said weigher giving out control impulses passed to an electrical adding mechanism for summation of the positive and negative impulses corresponding to overweights or underweights, and having means so that the adding mechanism will initiate an adjustment until a tendency to over or underweights sets in.

9. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated control-signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said conveyor device of said control measuring device comprising at least one radially arranged wiper plate means being rotatable in a housing in a horizontal plane so that the path of travel thereof overlaps said distributor plate and covers on upper opening of said control measuring chamber, and said weigher giving out control impulses passed to an electrical adding mechanism for summation of the positive and negative impulses corresponding to overweights or underweights, and having means so that the adding mechanism will initiate an adjustment until a tendency to over or underweights sets in.

10. A dispensing machine operating on volumetric principle and having measured chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated control-signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said control measuring chamber being of the same size as said measuring chambers of said dispensing machine and being arranged so as to be adjustable simultaneously with said measuring chambers, and said weigher giving out control impulses passed to an electrical adding mechanism for summation of the positive and negative impulses corresponding to overweights or underweights, and having means so that the adding mechanism will initiate an adjustment until a tendency to over or underweights sets in.

11. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated control-signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said conveyor device of said control measuring device comprising at least one radially arranged wiper plate means being rotatable in a housing in a horizontal plane so that the path of travel thereof overlaps said distributor plate and covers an upper opening of said control measuring chamber, said control measuring chamber being of the same size as the said measuring chambers of said dispensing machine and being arranged so as to be adjustable simultaneously with said measuring chambers, and said weigher giving out control impulses passed to an electrical adding mechanism for summation of the positive and negative impulses corresponding to overweights or underweights, and having means so that the adding mechanism will initiate an adjustment until a tendency to over or underweights sets in.

12. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said housing of said conveyor device for the control measuring device being provided with an opening and a mirror being directed towards this opening to allow an attendant to observe the filling operation of the control measuring device.

13. A dispensing machine operating on volumetric principle and having measuring chambers being adapted to be adjusted automatically by a control measuring device in accordance with the varying poured weight of filling material passing into said machine, and distributor plate means supplying said measuring chambers with said filling material, said control measuring device comprising an adjustable control measuring chamber and an associated signal-emitting weigher, and being separate from and arranged beyond the periphery of and in parallel with the distributor plate means supplying measuring chambers of said dispensing machine, and being provided with a conveyor device taking said filling material from said distributor plate and filling it into said control measuring chamber, said conveyor device of said control measuring device comprising at least one radially arranged wiper plate means being rotatable in a housing in a horizontal plane so that the path of travel thereof overlaps said distributor plate and covers an upper opening of said control measuring chamber, said housing of said conveyor device for the control measuring device being provided with an opening and a mirror being directed towards this opening to allow an attendant to observe the filling operation of the control measuring device.

References Cited in the file of this patent
UNITED STATES PATENTS

| | | |
|---|---|---|
| 893,583 | Hey et al. | July 14, 1908 |
| 2,609,965 | Kast | Sept. 9, 1952 |
| 2,716,534 | Howard | Aug. 30, 1955 |
| 2,925,835 | Mojonnier et al. | Feb. 23, 1960 |